March 1, 1960 G. A. LYON 2,926,960
WHEEL COVER
Filed March 12, 1957
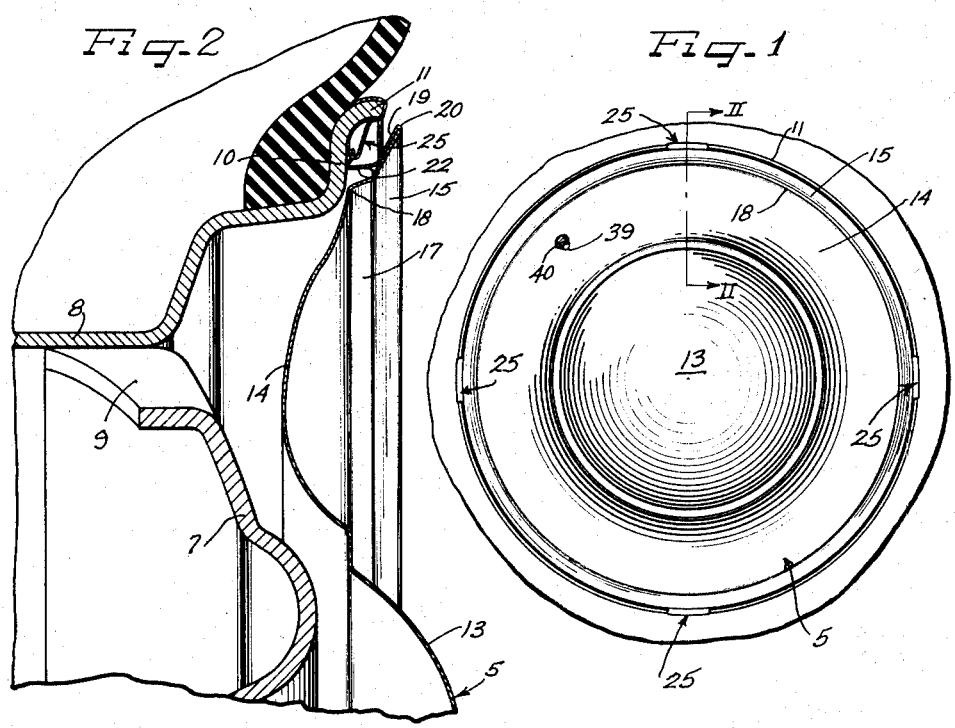
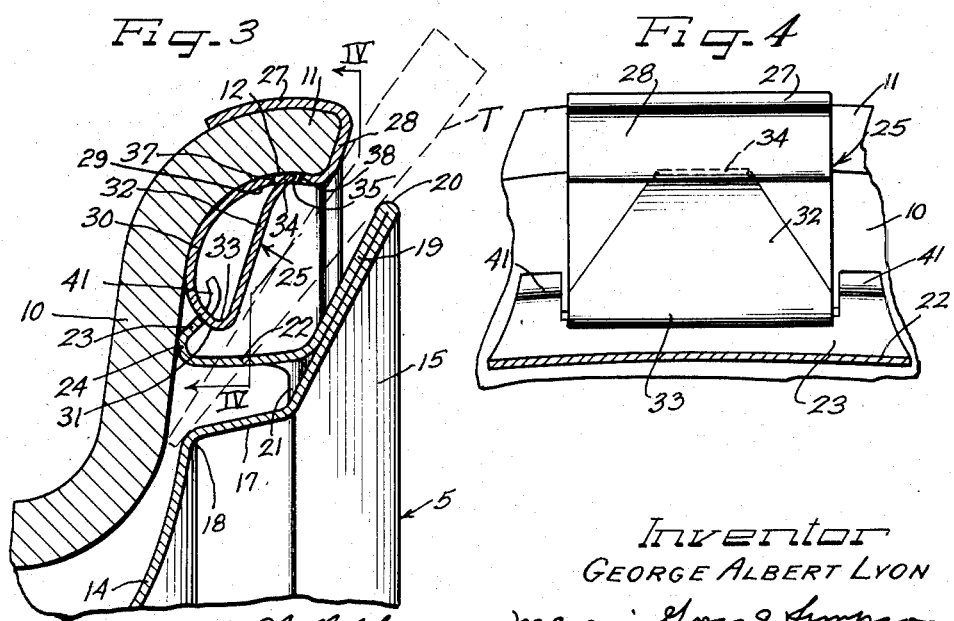
Inventor
GEORGE ALBERT LYON
by Hill Sherman Meroni Gross & Simpson
Attys.

United States Patent Office 2,926,960
Patented Mar. 1, 1960

2,926,960

WHEEL COVER

George Albert Lyon, Detroit, Mich.

Application March 12, 1957, Serial No. 645,508

14 Claims. (Cl. 301—37)

The present invention relates to improvements in wheel structures and more particularly concerns the ornamental and protective covering of the outer sides of vehicle wheels.

As the diameter of vehicle wheels has been decreasing, there has been growing interest on the part of automobile stylists or designers to wish to increase the diameter of wheel covers to cover substantially entirely the tire rim inclusive of the terminal flange. At the same time, there is a persistent economic pressure to maintain the cost of wheel covers as low as possible and if practicable to reduce the cost. In addition, prevention or at least minimizing the liability of theft of wheel covers is receiving substantial attention.

It is therefore an important object of the present invention to provide a wheel structure that meets the several requirements just mentioned to a satisfactory extent.

Another object of the invention is to provide novel cover retaining means especially suitable for use with more or less conventional tire rim terminal flange structure.

A further object of the invention is to provide a wheel cover structure which can be constructed to be substantially unattractive to wheel cover thieves by virtue of adaptation for only a single automobile model or line.

Still another object of the invention is to provide improved cover structure utilizing a minimum of material yet providing maximum cover retaining means.

Yet another object of the invention is to provide novel retaining clip means for wheel covers and especially adapted for application to the terminal flange of a tire rim.

It is also an object of the invention to provide improved means for retaining a wheel cover in snap-on, pry-off relation to the terminal flange of a vehicle wheel.

Other objects, features and advantages of the present invention will be readily apparent from the following detailed description of a preferred embodiment thereof taken in conjunction with the accompanying drawing in which:

Figure 1 is an outer side elevational view of a wheel structure embodying features of the invention;

Figure 2 is an enlarged fragmentary radial sectional detail view taken substantially on the line II—II of Figure 1;

Figure 3 is a substantially enlarged fragmentary radial sectional detail view taken substantially in the same plane as Figure 2 but showing the terminal flange and cover margin and retaining structure in greater detail; and Figure 4 is a fragmentary sectional elevational detail view taken substantially on the line IV—IV of Figure 3.

A wheel cover 5 according to the present invention is adapted to be applied in snap-on, pry-off relation to the outer side of a vehicle wheel including a disk spider wheel body 7 attached in suitable manner as by welding or the like to a base flange 8 of a multi-flange, drop center tire rim, the wheel body providing at juncture with the tire rim wheel openings 9. At its outer side the tire rim includes a terminal flange that has a generally radially outwardly extending portion 10 and a turned generally axially outwardly extending extremity portion 11 which is of the conventional curved type providing a generally radially inwardly opening annular groove 12.

The wheel cover 5 is preferably constructed as a full disk cover from suitable sheet material that is adapted to be cold worked in suitable press equipment and finished as by polishing and plating or the like. Material that has been found satisfactory for this type of cover is stainless steel sheet or strip, brass, and considerable thought is being given to use of aluminum sheet in appropriate alloy for this purpose. Although the cover 5 is shown as a full disk type, it could comprise a ring shaped or annular member with a central hub cap providing in combination a complete wheel cover.

At its center the wheel cover 5 has a circular crown portion 13 about which is an annular generally dished intermediate portion 14 of substantial width for overlying the juncture portion between the wheel body 7 and the tire rim. At its outer margin the cover has an annular marginal portion 15 which is of a diameter to overlie the terminal flange, in the present instance substantially to the extremity portion 11 of the terminal flange. In the present instance, the marginal portion 15 is of generally frusto-conical radially and axially outwardly sloping shape provided with an annular angular generally axially extending radially inner reinforcing flange portion 17 joining the dished portion 14 on an indented generally axially inwardly directed annular reinforcing rib 18 arranged to be disposed in assembly opposite the radially inner portion of the terminal flange portion 10 and in spaced relation thereto.

An underturned integral flange 19 is preferably nested in laminar relation behind the cover marginal portion 15 and joins the same on a reinforcing and finishing turned edge 20.

At its inner extremity the flange 19 may be turned slightly to provide a reinforcing extremity 21 preferably spaced radially outwardly from juncture of the reinforcing flange portion 17 with the marginal portion 15.

Extending generally axially inwardly as integral one piece extensions from the flange terminal 21, is a plurality of cover retaining fingers 22 which are preferably of substantial width and derived from material that is in the corners of a polygonal blank, such as from the four corners of a square blank. The fingers are short in that they are preferably of about the same width or even a little shorter than the terminal flange extremity portion 11, and provided at their axially inner extremities with short and stiff generally radially and axially outwardly oblique cover retaining terminals 23 providing at juncture with the body portions of the fingers 22 seating shoulders 24 adapted to bottom against the terminal flange portion 10 and thereby maintain the cover in substantially spaced relation to not only the wheel body 7 but also the tire rim. It will be observed that the finger shoulder junctures 24 extend axially inwardly beyond the annular reinforcing shoulder 18 of the cover a distance sufficient to maintain the spaced relationship preferred between the shoulder 18 and the tire rim flange.

In the present instance the retaining fingers 22 and the terminals 23 are disposed on a diameter which is substantially less than the diameter within the terminal flange groove 12 and means are provided for engagement with the terminal flange for retaining engagement by the retaining finger terminals 23. To this end, cover retaining clips 25 are provided which are preferably in a number equal to the number of retaining fingers 22, such as four as best seen in Figure 1.

Each of the retaining clips 25 includes means for engagement with the terminal flange, means for retaining engagement by the retaining fingers of the cover, and means for self-retaining locking interengagement with the tire rim to avoid displacement or dislodgment of the retaining clips when the cover is pried from the wheel. For this purpose, each of the retaining clips 25 includes a generally open loop portion engageable in substantially snap-on relation over the terminal flange extremity portion 11 and including a leg portion 27 engageable with the radially outer side of the terminal flange portion 11 and preferably generally conformed to the convexly curved cross-sectional contour thereof. This leg 27 is joined by a connecting bight or web portion 28 to extend across the tip of the terminal flange portion 11, with an inner terminal flange lip hugging portion 29 engageable substantially retainingly with the terminal flange lip or extremity portion 11 at the inside of the groove 12.

From the rim lip engaging body portion 29 extends a cover retaining finger engageable loop portion or generally radially and axially inward extension 30 of the body portion 29 which preferably extends in generally conforming relation axially and radially inwardly in the juncture fillet between the terminal flange portions 10 and 11 and along the radially outer portion of the terminal flange radially extending portion 10 to provide a turned inner portion 31 extending generally axially outwardly and radially inwardly and providing a generally radially and axially inwardly facing shoulder diverging from the tire rim portion 10. The shoulder portion 31 is dimensioned to be engaged retainingly by the tips of the retaining finger terminals 23.

The self-retaining locking structure of the retaining clip 25 comprises a generally return-bent radially and axially outwardly oblique leg 32 extending from the extremity of the retaining shoulder 31 and preferably straight or slightly bowed inwardly in longitudinal section from a rounded reinforcing juncture shoulder 33. As will be observed in Figure 4, the retaining clip 25 is of substantial width inclusive of all of the portions thereof except that the locking leg 32 extends full width in the return-bent, that is radially and axially outward direction, for only a limited distance from the juncture shoulder 33 and then has the sides thereof tapered toward a distal extremity slightly axially outwardly turned biting tip 34 which is of a length to extend through a slot 35 which is provided to clear the same through the clip body leg 29 so that the tip 34 is engageable in retaining biting relation against the surface of the terminal flange lip 11 within the groove 12. At its axially inner side, the slot 35 provides a shoulder 37 that closely approaches the tip portion 34 so as to oppose the tip portion 34 and shoulder thereagainst on any tendency of the retaining leg portion 30 to be drawn or forced in an axially outward direction while the retaining tip 34 is in biting engagement against the terminal flange lip.

By preference, the retaining cilps 25 are constructed and dimensioned to engage fairly snugly with the terminal flange, and in applying the same to the terminal flange, the rim flange engaging loop portion 27, 28, 29 may be hammered into place by striking against the web portion 28 with a mallet or hammer. It will be understood that the clip 25 may be made from a reasonably resilient, hard material having at least a substantial resilience and resistance to damaging deformation during the hammering-on thereof, but will effect a resilient grip upon the terminal flange portion 11. Prior to application of the clip 25 to the tire rim, the tip portion 34 may extend to a slightly greater diameter than the surface within the rim flange groove 12 to be engaged by the tip so that the clip locking leg 32 will be deflected slightly radially inwardly, placing the turned cover finger engageable clip leg 30 under some inwardly deflected tension which reacts to maintain a tensioned grip of the retaining tip 34 against the rim flange lip 11. If there is a tendency of the tip 34 to resist camming home onto the inner surface of the rim flange lip 11, a shoulder 38 defining the axially outer side of the tip clearance slot 35 will engage and force the tip 34 axially inwardly as the clip is driven home onto the tire rim flange. It will be appreciated, of course, that the retaining clips 25 (Fig. 1) will be placed properly to receive the retaining fingers of the cover in proper alignment therewith.

In applying the cover 5 to the outer side of the wheel, a valve stem 39 is aligned with a valve stem aperture 40 in the dished intermediate portion 14 of the wheel cover and the cover pressed home on the wheel. It may be that during registration of the valve stem aperture 40 with the valve stem, the adjacent two retaining fingers 22 will be aligned with the respective retaining clips 25 therefor and the retaining finger terminals 23 will be placed into engagement with the retaining shoulders 31 of the clips. Then, the remaining retaining fingers 22 will have the retaining terminals 23 thereof in engagement with the rounded juncture shoulders 33 of the retaining clips in alignment therewith and as axially inward pressure is applied to the adjacent margin of the cover, the retaining finger terminals 23 will cam inwardly on the shoulders 33, causing the retaining fingers 22 to be flexed resiliently and deflected radially inwardly until the retaining terminals 23 snap behind the retaining shoulders 31 of the retaining clips. The cover will then be maintained in spaced, centered relation to the outer side of the wheel by the coaction of the retaining clips 25 and the retaining finger shoulders 24. Since the interlock legs 32 are in firm engagement with the terminal flange lip 11 at the tips 34, the clip shoulders 31 will be substantially rigid in a radial sense, that is the direction in which resilient tension grip is applied to the shoulders 31 of the retaining clips by the retaining finger terminals 23 flexibly resiliently tensioned by the retaining fingers 22 to thrust generally radially outwardly against the shoulders 31. Any tendency toward axially outward displacement of the cover from the wheel is resisted by the clip shoulders 31 as braced by the interlock and bracing legs 32 which it will be observed engage the terminal flange lip portion 11 substantially axially outwardly relative to the respective clip shoulder 31.

For removing the cover 5 from the wheel, a pry-off tool T such as a screwdriver (Fig. 3) may be introduced into the substantial gap between the marginal portion 15 and underturned flange 19 of the cover and past the underturned flange terminal portion 21 into engagement with the reinforcing and pry-off rib or shoulder 18. By virtue of the fact that the pry-off shoulder 18 is disposed at least in a plane with and preferably slightly behind the point of engagement of the retaining finger terminal tips with the retaining shoulder 31, pry-off leverage against the shoulder 18 generally axially outwardly will be especially efficient in effecting generally radially inward and axially outward camming sliding dislodgment of the tips of the retaining terminals 23 of the cover fingers along the shoulder 31 until by combination of such outward camming and resilient inward flexing of the retaining fingers the finger terminals are dislodged from the retaining clips. During this action, there may be a slight amount of axially outward flexing of the clip leg 30 but this is substantially resisted by the bracing leg 32 by virtue of its anchorage at the terminal 34 with the terminal flange lip 11.

In order to hold the cover 5 against turning on the wheel and thus possible straining of the valve stem 39 by movement out of registration therewith of the valve stem aperture 40, means are provided on at least one of the retaining fingers 22 for coacting with the retaining clip 25 with which it is associated in the assembly to restrain the cover against turning. To this end, the retaining terminal 23 of at least one of the retaining fingers is preferably provided with a pair of transversely spaced turn-preventing lug extensions 41 at the opposite sides thereof and projecting therebeyond for opposing the respective opposite sides of the retaining clip 25 as best seen in Figure 4. The spacing between the inner or opposed edges of the extensions 41 is slightly greater than the width of the shoulder portion 31 of the retaining clip so as to afford tolerance for free assembly and disassembly or snap-on, pry-off relative movement of the retaining finger and clip. Moreover, it will be observed that the extensions 41 are turned to extend generally radially outwardly and axially inwardly at their tips. This is for the purpose of facilitating assembly approach of the respective retaining finger with the retaining clip 25 especially where such retaining finger with the projections 41 is located on that portion of the cover near the valve stem aperture 40 so that the adjacent marginal portion of the cover is customarily canted toward the tire rim as an incident to registering the valve stem aperture 40 with the valve stem 39 in applying the cover to the wheel.

Should it become desirable to remove the retaining clip 25 in any instance, that can be readily effected after removal of the cover by inserting a pry-off tool such as a screwdriver into the loop between the clip fingers 30 and 32 and prying the bracing leg finger 32 generally axially outwardly to cause the same to release its biting grip against the terminal flange lip 11, and by continuing the pry-off force thus started, the tip 34 of the leg 32 will engage against the shoulder 38 and as a result of the continuing pry-off force plus some radially inward flexing of the clip body 29 snap the clip 25 free from the terminal flange. Such flexing, however, is of rather small extent so that there is little danger of springing the clip parts too much before the same will snap free from the terminal flange. As a result, the clips can be used over and over again, as desired.

As a deterrent upon possible theft, the length of the retaining loop portion 30, 32 of the retaining clip 25 may be varied within reasonable range so that the shoulder 31 may be disposed at predetermined distance radially inwardly relative to the terminal flange portion 11 in any particular instance. Of course, the retaining fingers 22 can also be correspondingly located in correlated radially inward spaced relation to effect efficient retaining gripping engagement with the particular retaining clips 25 provided therefor. In this manner a particularly dimensioned clip with respect to its cover finger receiving portion and corresponding cover finger relationship can be afforded for a large number of makes or models of automobiles in order to prevent interchangeability of the covers. For example, the relative dimensions for one model year can be altered with respect to preceding model years of the same make of automobile, thus discouraging theft of later model covers for application to earlier model automobiles of the same make or for use on any other make of automobile. It will also be observed that since the diameter on which the retaining fingers 22 are disposed is quite different from any diameter of radially facing surfaces of the tire rim, it is impossible to apply the wheel cover to the wheel without a complementary set of the retaining clips 25.

It will be understood that modifications and variations may be effected without departing from the scope of the novel concepts of the present invention.

I claim as my invention:

1. In a wheel structure including a tire rim having a terminal flange with generally radially and generally axially extending portions, a cover for disposition at the outer side of the wheel and having a marginal portion for overlying the terminal flange provided with cover retaining means providing terminal structure for overlying the radially extending portion of the terminal flange and spaced from the axially extending portion of the terminal flange, and retaining clip means having a loop portion for retaining gripping engagement with the axially extending flange portion and a loop portion for overlying the radially extending flange portion and providing a retaining shoulder for snap-on, pry-off retaining interengagement by said cover retaining means terminal structure, said retaining means terminal engageable loop portion of the clip including biting edge means engageable with the axially extending rim flange portion to retain the clip against axially outward displacement from the tire rim.

2. In a wheel structure including a tire rim having a terminal flange with generally radially and generally axially extending portions, a cover for disposition at the outer side of the wheel and having a marginal portion for overlying the terminal flange provided with cover retaining means providing terminal structure for overlying the radially extending portion of the terminal flange and spaced from the axially extending portion of the terminal flange, and retaining clip means having a loop portion for retaining gripping engagement with the axially extending flange portion and a loop portion for overlying the radially extending flange portion and providing a retaining shoulder for snap-on, pry-off retaining interengagement by said cover retaining means terminal structure, said rim flange engageable loop of the clip including a body portion connecting the clip loops and provided with an aperture and said retaining terminal engageable loop having a portion thereof projecting through said aperture and thrusting against the axially extending rim flange portion to retain the clip against displacement relative to the rim flange.

3. In a wheel structure including a tire rim having a terminal flange with generally radially and generally axially extending portions, a cover for disposition at the outer side of the wheel and having a marginal portion for overlying the terminal flange provided with cover retaining means providing terminal structure for overlying the radially extending portion of the terminal flange and spaced from the axially extending portion of the terminal flange, and retaining clip means having a loop portion for retaining gripping engagement with the axially extending flange portion and a loop portion for overlying the radially extending flange portion and providing a retaining shoulder for snap-on, pry-off retaining interengagement by said cover retaining means terminal structure, said last mentioned loop portion having a bracing member extending generally away from said shoulder and stiffly bracing it to resist deflection, said cover retaining means terminal structure comprising retaining flange structure engageable thrustingly under resilient tension against the clip shoulder and generally toward said bracing member.

4. In a wheel structure including a tire rim having a terminal flange with generally radially and generally axially extending portions, a cover for disposition at the outer side of the wheel and having a marginal portion for overlying the terminal flange provided with cover retaining means providing terminal structure for overlying the radially extending portion of the terminal flange and spaced from the axially extending portion of the terminal flange, and retaining clip means having a loop portion for retaining gripping engageemnt with the axially extending flange portion and a loop portion for overlying the radially extending flange portion and providing a retaining shoulder for snap-on, pry-off retaining interengagement by said cover retaining means terminal structure, said cover retaining means including a shoulder engageable as a stop against the radially extending terminal flange portion and thereby supporting the cover in substantially spaced relation to the remainder of the wheel.

5. In a wheel structure including a tire rim having a terminal flange with generally radially and generally axially extending portions, a cover for disposition at the outer side of the wheel and having a marginal portion for overlying the terminal flange provided with cover retaining means providing terminal structure for overlying the radially extending portion of the terminal flange and spaced from the axially extending portion of the terminal flange, and retaining clip means having a loop portion for retaining gripping engagement with the axially extending flange portion and a loop portion for overlying the radially extending flange portion and providing a retaining shoulder for snap-on, pry-off retaining interengagement by said cover retaining means terminal structure, the cover having an indented pry-off rib shoulder located radially inwardly adjacent to the retaining structure and the radially extending portion of the terminal flange of said retaining means and the margin of the cover being disposed to be in substantially spaced relation to the terminal flange to afford a substantial gap through which a pry-off tool is accessible directly to the pry-off shoulder.

6. In a wheel structure including a terminal flange having a radially outwardly extending portion and a generally axially outwardly turned extremity lip portion, a cover retaining clip including a loop portion engageable with said terminal flange lip portion and a second loop disposed radially inwardly for overlying disposition to the radially extending terminal flange portion and having a generally radially inwardly extending portion closely opposing the radially outwardly extending terminal flange portion and a locking leg in return-bent spaced overlying relation to said second loop portion and directed bracingly generally radially outwardly to engage endwise against the terminal flange lip portion.

7. In a wheel structure including a terminal flange having a radially outwardly extending portion and a generally axially outwardly turned extremity lip portion, a cover retaining clip including a loop portion engageable with said terminal flange lip portion and a second loop disposed radially inwardly for overlying disposition to the radially extending terminal flange portion and having an interlock portion thereon retainingly engageable with the terminal flange lip portion, said interlock portion comprising a bracing leg extending through an aperture in the terminal flange lip engaging loop portion of the clip to bite endwise against the opposing surface of the terminal flange lip portion.

8. In a wheel structure including a terminal flange having a radially outwardly extending portion and a generally axially outwardly turned extremity lip portion, a cover retaining clip including a loop portion engageable with said terminal flange lip portion and a second loop disposed radially inwardly for overlying disposition to the radially extending terminal flange portion and having an interlock portion thereon retainingly engageable with the terminal flange lip portion, said interlock portion comprising a bracing leg extending through an aperture in the terminal flange lip engaging loop portion of the clip to bite endwise against the opposing surface of the terminal flange lip portion, the clip having a shoulder at said aperture engageable against said bracing leg upon tendency toward axially outward dislodgment of the clip to thereby resist such dislodgment.

9. In a wheel structure, a cover retaining clip having a loop portion for retaining engagement over an axially outwardly extending terminal flange lip and a second loop portion extending therefrom for overlying the radially extending portion of a terminal flange and a return-bent leg extending from the last mentioned loop portion through an aperture in the first mentioned loop portion.

10. In a wheel structure, a cover retaining clip having a loop portion for retaining engagement over an axially outwardly extending terminal flange lip and a second loop portion extending therefrom for overlying the radially extending portion of a terminal flange and a return-bent leg extending from the last mentioned loop portion through an aperture in the first mentioned loop portion, said aperture having axially inner and axially outer shoulders opposing the part of said leg that extends therethrough.

11. In a wheel structure, a cover retaining clip having a loop portion for retaining engagement over an axially outwardly extending terminal flange lip and a second loop portion extending therefrom for overlying the radially extending portion of a terminal flange and a return-bent leg extending from the last mentioned loop portion through an aperture in the first mentioned loop portion, said leg having the portion thereof extending through the aperture turned generally toward the bight portion of the first mentioned loop portion of the clip.

12. In a wheel structure including a tire rim having a terminal flange including a radially and axially inner generally radially outwardly extending and axially outwardly facing portion and at the radially outer terminus thereof a generally axially outwardly turned lip portion, a cover retaining clip having a loop portion engaged over and retained on the wheel by engagement with the axially extending terminal flange portion and provided with a turned loop portion overlying the radially extending terminal flange portion and having a generally radially and axially inwardly facing cover retaining shoulder in opposed spaced relation to said radially extending terminal flange portion, a cover for disposition over the outer side of the wheel including a marginal portion for overlying the terminal flange and having therebehind a generally axially inwardly extending retaining finger having a shoulder engageable with the radially extending terminal flange portion adjacent to said clip loop shoulder and provided with a generally radially and axially outwardly extending terminal engageable in press-on, pry-off relation with said clip shoulder to thereby hold the finger shoulder against the radially extending terminal flange portion, said terminal having at the respective opposite sides thereof turn-preventing extensions in the form of short flanges that extend generally radially and axially outwardly and are turned at their free end portions generally radially outwardly and axially inwardly for facilitating retaining interengagement with the clip in the course of applying the cover to the wheel and interengaging the retaining finger with the retaining loop of the clip.

13. In a wheel structure including a tire rim having a terminal flange provided with a generally radially outwardly extending portion leading into a generally axially outwardly extending lip portion, a cover member for disposition over the outer side of the wheel including a circular marginal portion for overlying the terminal flange, cover retaining spring clips behind the cover marginal portion and provided with loop portions shouldering against the radially inner side of the terminal flange lip portion and projecting generally radially inwardly into overlying relation to the axially extending terminal flange portion, and having a generally return-bent leg directed generally radially outwardly and thrusting under endwise biting retaining engagement against the terminal flange lip.

14. In a wheel structure including a tire rim having a terminal flange provided with a generally radially outwardly extending portion leading into a generally axially outwardly extending lip portion, a cover member for disposition over the outer side of the wheel including a circular marginal portion for overlying the terminal flange, cover retaining spring clips behind the cover marginal portion and provided with loop portions shouldering against the radially inner side of the terminal flange lip portion and projecting generally radially inwardly into overlying relation to the axially extending terminal flange portion, and having a generally return-bent leg directed generally radially outwardly and thrusting under endwise biting retaining engagement against the terminal flange lip, the marginal extremity of the cover being in spaced relation to said terminal flange lip to enable insertion of a pry-off tool into the gap thus provided, the cover margin having radially inwardly adjacent to the cover retaining means and in overlying relation to said axially extending terminal flange portion an indented pry-off shoulder normally disposed in spaced relation to the opposing portion of the radially extending terminal flange portion to enable insertion of the tip of a pry-off tool behind said pry-off shoulder.

(References on following page)

References Cited in the file of this patent

UNITED STATES PATENTS

| | | |
|---|---|---|
| 2,137,416 | Rubsam | Nov. 22, 1938 |
| 2,329,854 | Rubsam | Sept. 21, 1943 |
| 2,351,655 | Aske | June 20, 1944 |
| 2,394,958 | Wood | Feb. 12, 1946 |
| 2,644,721 | Grimshaw | July 7, 1953 |
| 2,729,509 | Lyon | Jan. 3, 1956 |

FOREIGN PATENTS

| | | |
|---|---|---|
| 495,638 | Canada | Sept. 1, 1953 |